United States Patent
Ohara

(10) Patent No.: US 8,623,444 B2
(45) Date of Patent: Jan. 7, 2014

(54) OIL-AND-FAT COMPOSITION AND METHOD FOR PRODUCING THE SAME

(75) Inventor: Atsushi Ohara, Tokyo (JP)

(73) Assignee: The Nisshin OilliO Group, Ltd., Tokyo (JP)

( * ) Notice: Subject to any disclaimer, the term of this patent is extended or adjusted under 35 U.S.C. 154(b) by 0 days.

(21) Appl. No.: 13/522,484

(22) PCT Filed: Apr. 27, 2011

(86) PCT No.: PCT/JP2011/060275
§ 371 (c)(1),
(2), (4) Date: Jul. 16, 2012

(87) PCT Pub. No.: WO2011/138918
PCT Pub. Date: Nov. 10, 2011

(65) Prior Publication Data
US 2012/0295010 A1    Nov. 22, 2012

(30) Foreign Application Priority Data

May 6, 2010 (JP) .................................. 2010-106694

(51) Int. Cl.
*C11B 7/00* (2006.01)
*A23D 9/00* (2006.01)

(52) U.S. Cl.
USPC ........................................ 426/607; 426/601

(58) Field of Classification Search
USPC ...................................................... 426/607
See application file for complete search history.

(56) References Cited

U.S. PATENT DOCUMENTS

| | | | |
|---|---|---|---|
| 5,405,639 A * | 4/1995 | Pierce et al. ................ | 426/607 |
| 7,611,744 B2 * | 11/2009 | Cain et al. ................... | 426/606 |
| 7,618,670 B2 * | 11/2009 | Ullanoormadam ........... | 426/607 |
| 7,794,773 B2 * | 9/2010 | Cain et al. ................... | 426/606 |
| 8,124,158 B2 * | 2/2012 | Oonishi et al. ............... | 426/580 |
| 8,182,857 B2 * | 5/2012 | Cleenewerck et al. ....... | 426/601 |
| 8,361,531 B2 * | 1/2013 | 't Zand et al. ............... | 426/607 |
| 2009/0029024 A1 * | 1/2009 | McNeill et al. ............. | 426/556 |
| 2010/0215809 A1 * | 8/2010 | 'tZand et al. ................ | 426/94 |
| 2010/0215810 A1 * | 8/2010 | Zand et al. .................. | 426/94 |
| 2010/0278985 A1 | 11/2010 | Akahane et al. | |

FOREIGN PATENT DOCUMENTS

| | | |
|---|---|---|
| JP | 07-155106 A | 6/1995 |
| JP | 09-316484 A | 12/1997 |
| JP | 2007-319043 A | 12/2007 |
| JP | 2009-153425 A | 7/2009 |
| JP | 2009-284899 A | 12/2009 |
| WO | WO 2010/149323 A2 | 12/2010 |

OTHER PUBLICATIONS

Lin, S. W. 2002. Palm Oil. in Vegetable Oils in Food Technology: Composition, Properties and Uses. Gunstone, Frank, editor. CRC Press. Boca Raton, Florida. pp. 59-97.*
Noor Lida, H. M. D. 2002. JAOCS 79(11)1137.*
International Search Report in PCT/JP2011/060275 dated Aug. 9, 2011(English Translation Thereof).
European Search Report dated Jan. 24, 2013.

* cited by examiner

*Primary Examiner* — Carolyn Paden
(74) *Attorney, Agent, or Firm* — McGinn Intellectual Property Law Group, PLLC

(57) ABSTRACT

An oil-and-fat composition, meets the following five requirements (a) to (e):
(a) a X2O content is 50 to 80% by mass;
(b) a XOX content is not more than 50% by mass;
(c) a mass ratio XOX/X2O is 0.3 to 0.8;
(d) a mass ratio PStO/X2O is 0.2 to 0.6; and
(e) a mass ratio St/P is 0.4 to 1.5.

In the five conditions (a) to (e), X, O, P, St, X2O, XOX and PStO respectively represent the following.
  X: saturated fatty acid having carbon atom of not less than 16;
  O: oleic acid;
  P: palmitic acid;
  St: stearic acid;
  X2O: triglyceride in which two molecules of X and one molecule of O are bonded;
  XOX: triglyceride in which X is bonded to 1,3-position and O is bonded to 2-position; and
  PStO: triglyceride in which P, St and O are bonded.

8 Claims, No Drawings

OIL-AND-FAT COMPOSITION AND METHOD FOR PRODUCING THE SAME

TECHNICAL FIELD

This invention relates to an oil-and-fat composition and a method for producing the oil-and-fat composition, in particular, to an oil-and-fat composition that is capable of being used as a non-tempering hard butter when a chocolate is produced and a method for producing the oil-and-fat composition.

BACKGROUND ART

Hard butter used as a substitution for cacao butter is generally classified into a tempering hard butter and a non-tempering hard butter.

The tempering hard butter is made from similar fats having a structure of symmetrical triglyceride closely resembling the cacao butter. Consequently, it can be easily substituted for the cacao butter and can be used by being mixed with the cacao butter at an arbitrary ratio. In addition, the tempering hard butter has a sharp meltability in the mouth, but when a chocolate is produced by using this, it is necessary to carry out a tempering process similarly to a case of the cacao butter.

On the other hand, the non-tempering hard butter resembles the cacao butter in a melting property, but extremely differs in a structure of oil-and-fat. Consequently, it has a low compatibility with the cacao butter. However, it is lower in price than the cacao butter and has a good workability since a complicated tempering work is not needed so that it is widely used in confectionery and bakery industries. The non-tempering hard butter is roughly classified into a lauric acid type and a non-lauric acid type.

Of the non-tempering hard butter, a lauric acid type hard butter is known, the hard butter typically being obtained by hydrogenating and extremely hardening a hard portion (a palm kernel stearin) obtained by fractionating a palm kernel oil. This kind of hard butter has an extremely sharp melting property, but the blend ratio of cacao butter should be decreased as much as possible since it has an extremely bad compatibility with the cacao butter so that chocolates using this become poor in cacao flavor. Further, there is a disadvantage that the hard butter comprises not less than 50 mass % of a lauric acid as the constituent fatty acid so that it becomes extremely poor in the flavor when being hydrolyzed in a poor state of preservation.

Of the non-tempering hard butter, a non-lauric acid type hard butter is also called a trans-acid type hard butter, and the following hard butter is known, the hard butter typically being obtained by isomerizing-hydrogenating a liquid oil such as a palm olein having a low melting point or a soybean oil, and the hard butter being a hard portion or a medium-melting portion obtained by that the isomerized-hydrogenated one is further fractionated as necessary. Although the non-lauric acid type hard butter has a melting property lacking in sharpness in comparison with the lauric acid type hard butter, it has a better compatibility with the cacao butter than the lauric acid type hard butter so that it can be blended relatively more than the lauric acid type hard butter. However, the non-lauric acid type hard butter comprises a good deal of trans-fatty acid so that it has been kept away from being used since it was recognized that the trans-fatty acid harms health.

Therefore, the development of a non-lauric acid type non-tempering hard butter having a low trans-fatty acid content is required.

As the non-lauric acid type non-tempering hard butter containing no trans-fatty acid, a non-tempering hard butter containing SOS type triglyceride and SSO type triglyceride in a predetermined range where St/P is set to a predetermined range (refer to Patent Document 1), and a non-tempering hard butter having contents of SSS and S2U, a mass ratio SUS/SSU, a total content of SU2 and UUU and amass ratio St/P that are respectively set to a predetermined range (refer to Patent Document 2) are known. Although it is recognized that these hard butters have some efficacy in meltability in the mouth and snap characteristics, they are not necessarily satisfactory for processing suitability in case of using it as a coating chocolate, and an appearance of a coated product.

RELATED ART DOCUMENTS

Patent Documents

[Patent Document 1] JP-A-1997(H09)-316484
[Patent Document 2] JP-A-2009-284899

SUMMARY OF THE INVENTION

Problem to be Solved by the Invention

Consequently, it is one object of the invention to provide an oil-and-fat composition that is a non tempering hard butter having a low trans-fatty acid content even though a non-lauric acid type, is excellent in processing suitability in case of using it as a coating chocolate, and is capable of providing a coated product with a good appearance, and a method for producing the oil-and-fat composition.

Here, the non-lauric acid type means that a lauric acid content is less than 5% by mass, preferably the lauric acid content is less than 2% by mass and more preferably the lauric acid content is less than 1% by mass. Also, the low trans-fatty acid content means that a trans-fatty acid content is not more than 22% by mass, preferably the trans-fatty acid content is not more than 15% by mass, more preferably the trans-fatty acid content is not more than 10% by mass and most preferably the trans-fatty acid content is not more than 5% by mass.

Means for Solving the Problem

In order to achieve the above-mentioned object, the invention provides an oil-and-fat composition meeting the five requirements (a) to (e) described below.
  (a) a X2O content is 50 to 80% by mass;
  (b) a XOX content is not more than 50% by mass;
  (c) a mass ratio XOX/X2O is 0.3 to 0.8;
  (d) a mass ratio PStO/X2O is 0.2 to 0.6; and
  (e) a mass ratio St/P is 0.4 to 1.5.
In the five requirements (a) to (e), X, O, P, St, X2O, XOX and PStO respectively represent the following.
  X: saturated fatty acid having carbon atom of not less than 16;
  O: oleic acid;
  P: palmitic acid;
  St: stearic acid;
  X2O: triglyceride in which two molecules of X and one molecule of O are bonded;
  XOX: triglyceride in which X is bonded to 1,3-position and O is bonded to 2-position; and
  PStO: triglyceride in which P, St and O are bonded.
Further, in order to achieve the above-mentioned object, the invention provides a method for producing an oil-and-fat composition comprising fractionating a mixed oil containing 50 to 95% by mass of an olein part of transesterified oil and 5 to 50% by mass of a XOX type oil-and-fat, so as to obtain a stearin part.

In the above, the olein part of transesterified oil and the XOX type oil-and-fat respectively represent the following.

Olein part of transesterified oil: an olein part obtained by transesterifying a raw oil-and-fat containing 10 to 40% by mass of oleic acid, 10 to 50% by mass of stearic acid and 15 to 70% by mass of palmitic acid, and then fractionating it XOX type oil-and-fat: an oil-and-fat containing not less than 45% by mass of XOX Furthermore, in order to achieve the above-mentioned object, the invention provides a method for producing an oil-and-fat composition comprising mixing 60 to 95% by mass of a stearin part of transesterified oil and 5 to 40% by mass of a XOX type oil-and-fat.

In the above, the stearin part of transesterified oil and the XOX type oil-and-fat respectively represent the following.

Stearin part of transesterified oil: a stearin part obtained by transesterifying a raw oil-and-fat containing 10 to 40% by mass of oleic acid, 10 to 40% by mass of stearic acid and 30 to 70% by mass of palmitic acid, and then fractionating it so as to obtain an olein part, and further fractionating the olein part XOX type oil-and-fat: an oil-and-fat containing not less than 45% by mass of XOX Further, in the present invention, the above-mentioned fatty acid such as oleic acid shows a fatty acid that constitutes an oil and fat, and in particular, substantively shows a fatty acid that binds chemically to triglyceride.

Effect of the Invention

According to the invention, an oil-and-fat composition that is a non-tempering hard butter having a low trans-fatty acid content even though a non-lauric acid type, is excellent in processing suitability in case of using it as a coating chocolate, and is capable of providing a coated product with a good appearance, and a method for producing the oil-and-fat composition can be provided.

MODE FOR CARRYING OUT THE INVENTION (Oil-And-Fat Composition According to Embodiment of the Invention)

An oil-and-fat composition according to an embodiment of the invention meets the five requirements (a) to (e) described below.

(a) a X2O content is 50 to 80% by mass;
(b) a XOX content is not more than 50% by mass;
(c) a mass ratio XOX/X2O is 0.3 to 0.8;
(d) a mass ratio PStO/X2O is 0.2 to 0.6; and
(e) a mass ratio St/P is 0.4 to 1.5.

In the five requirements (a) to (e), X, O, P, St, X2O, XOX and PStO respectively represent the following.

X: saturated fatty acid having carbon atom of not less than 16;
O: oleic acid;
P: palmitic acid;
St: stearic acid;
X2O: triglyceride in which two molecules of X and one molecule of O are bonded (XXO+XOX+OXX);
XOX: triglyceride in which X is bonded to 1,3-position and O is bonded to 2-position; and
PStO: triglyceride in which P, St and O are bonded (PStO+POSt+StPO+StOP+OPSt+OStP).

(Requirement (a))

An oil-and-fat composition according to an embodiment of the invention has a X2O content, namely a (XXO+XOX) content, of 50 to 80% by mass, preferably 55 to 75% by mass, more preferably 60 to 75% by mass, most preferably 64 to 71% by mass. X is saturated fatty acid having carbon atom of not less than 16, preferably 16 to 22, more preferably 16 to 20, most preferably 16 to 18.

(Requirement (b))

An oil-and-fat composition according to an embodiment of the invention has a XOX content of not more than 50% by mass, preferably not more than 45% by mass, more preferably 20 to 40% by mass, most preferably 24 to 40% by mass. X is saturated fatty acid having carbon atom of not less than 16, preferably 16 to 22, more preferably 16 to 20, most preferably 16 to 18.

(Requirement (c))

An oil-and-fat composition according to an embodiment of the invention has a mass ratio XOX/X2O of 0.3 to 0.8, preferably 0.34 to 0.74, more preferably 0.39 to 0.65, most preferably 0.42 to 0.65.

(Requirement (d))

An oil-and-fat composition according to an embodiment of the invention has a mass ratio PStO/X2O of 0.2 to 0.6, preferably 0.3 to 0.6, more preferably 0.3 to 0.55, furthermore preferably 0.35 to 0.5, most preferably 0.35 to 0.45.

(Requirement (e))

An oil-and-fat composition according to an embodiment of the invention has a mass ratio St/P of preferably 0.4 to 1.5, more preferably 0.5 to 1.5, furthermore preferably 0.6 to 1.4, furthermore preferably 0.7 to 1.35, most preferably not less than 0.7 and less than 1.0 as the requirement (e).

(Other Requirements)

It is preferable that an oil-and-fat composition according to an embodiment of the invention has an iodine value of 25 to 50, a melting point of 25 to 45 degrees C., a fatty acid content having carbon atom of not less than 16 of not less than 95% by mass, a trans-fatty acid content of not more than 22% by mass and a lauric acid content of less than 5% by mass as the other requirements. It is more preferable that the oil-and-fat composition according to an embodiment of the invention has an iodine value of 30 to 45, a melting point of 30 to 40 degrees C., a fatty acid content having carbon atom of 16 to 22 of not less than 98% by mass, a trans-fatty acid content of not more than 15% by mass and a lauric acid content of less than 2% by mass as the other requirements, and it is furthermore preferable that the oil-and-fat composition according to an embodiment of the invention has an iodine value of 30 to 40, a melting point of 30 to 35 degrees C., a fatty acid content having carbon atom of 16 to 18 of not less than 98.5% by mass, a trans-fatty acid content of not more than 10% by mass and a lauric acid content of less than 1% by mass as the other requirements. In addition, it is most preferable that the oil-and-fat composition according to an embodiment of the invention has an iodine value of 30 to 40, a melting point of 30 to 35 degrees C., a fatty acid content having carbon atom of 16 to 18 of not less than 98.5% by mass, a trans-fatty acid content of not more than 5% by mass and a lauric acid content of less than 1% by mass as the other requirements.

Also, the oil-and-fat composition according to an embodiment of the invention, if it is a widely-used hard butter, has a solid fat content (SFC) at 25 degrees C. of preferably 30 to 70%, more preferably 35 to 70%, and most preferably 40 to 70%, has the SFC at 30 degrees C. of preferably 20 to 50%, more preferably 22 to 50%, and most preferably 23 to 50%, and has the SFC at 35 degrees C. of preferably 5 to 25%, more preferably 5 to 20%, and most preferably 5 to 16%.

The value of SFC can be measured according to IUPAC method 2.150a Solid Content determination in Fats by NMR.

(Method for Producing Oil-And-Fat Composition According to the Embodiment of the Invention)

The oil-and-fat composition according to the embodiment of the invention can be produced by, for example, production methods 1 to 2 described below.

[Production Method 1]

The oil-and-fat composition according to the embodiment of the invention can be produced by fractionating a mixed oil containing 50 to 95% by mass of the following olein part of transesterified oil and 5 to 50% by mass of the following XOX type oil-and-fat, so as to obtain a stearin part.

In the above, olein part of transesterified oil and XOX type oil-and-fat respectively represent the following.

Olein part of transesterified oil: olein part obtained by transesterifying a raw oil-and-fat containing 10 to 40% by mass of oleic acid, 10 to 50% by mass of stearic acid and 15 to 70% by mass of palmitic acid, and then fractionating it XOX type oil-and-fat: oil-and-fat containing not less than 45% by mass of XOX (Olein Part of Transesterified Oil)

The olein part of transesterified oil can be obtained by transesterifying a raw oil-and-fat containing 10 to 40% by mass of oleic acid, 10 to 50% by mass of stearic acid and 15 to 70% by mass of palmitic acid, and then fractionating it. It is preferable to use a raw oil-and-fat containing 10 to 40% by mass of oleic acid, 10 to 45% by mass of stearic acid and 20 to 70% by mass of palmitic acid, and it is more preferable to use a raw oil-and-fat containing 10 to 40% by mass of oleic acid, 10 to 40% by mass of stearic acid and 30 to 70% by mass of palmitic acid, and it is furthermore preferable to use a raw oil-and-fat containing 10 to 35% by mass of oleic acid, 15 to 40% by mass of stearic acid and 35 to 65% by mass of palmitic acid, and it is furthermore preferable to use a raw oil-and-fat containing 10 to 30% by mass of oleic acid, 15 to 35% by mass of stearic acid and 35 to 55% by mass of palmitic acid. Particularly, for example, it includes a mixed oil of a palm-based oil-and-fat having an iodine value of 20 to 70 and an extremely hardened oil of an oil-and-fat in which the content of fatty acid having carbon atoms of not less than 16 in fatty acids constituting the oil-and-fat is not less than 90% by mass, the mixed oil having a mixing ratio of the palm-based oil-and-fat and the extremely hardened oil of 70:30 to 20:80.

As the palm-based oil-and-fat described above, any one can be used, if it is a palm oil and a fractionated oil of palm oil. In particular, it includes (1) a palm olein and a palm stearin which are a first stage fractionated oil of palm oil, (2) a palm olein (a palm super olein) and a palm mid fraction which are a second stage fractionated oil obtained by that the palm olein is fractionated, and (3) a palm olein (a soft palm) and a palm stearin (a hard stearin) which are a second stage fractionated oil obtained by that the palm stearin is fractionated, and the like. One or more than two selected from the above can be used by mixture.

The extremely hardened oil of an oil-and-fat containing not less than 90 mass % of fatty acids having carbon atoms of not less than 16 of fatty acids constituting the oil-and-fat includes an extremely hardened oil of a soybean oil, a rapeseed oil, a cotton seed oil, a sunflower oil, a safflower oil, a corn oil, a palm oil, a fractionated palm oil, a beef fat, a lard and the like. One or more than two selected from the above can be used by mixture. It is preferable that the extremely hardened oil has an iodine value of not more than 2.

The method of transesterification is not particularly limited, and usual methods, particularly, any one of a chemical transesterification and an enzymatic transesterification can be used, the chemical transesterification using a synthesis catalyst such as sodium methoxide and the enzymatic transesterification using lipase as a catalyst.

As the enzymatic transesterification, a transesterification having a low specificity at positions can be preferably used. A lipase formulation which can realize the transesterification having a low specificity at positions includes a lipase derived from Alcaligenes (for example, "lipase QLM", "lipase PL" etc. manufactured by Meito Sangyo Co., Ltd.) and a lipase derived from Candida (for example, "lipase OF" etc. manufactured by Meito Sangyo Co., Ltd.) and the like.

The chemical transesterification, for example, can be carried out according to the steps of drying oil-and-fat materials sufficiently, adding 0.1 to 1% by mass of sodium methoxide to the oil-and-fat materials, and reacting under reduced pressure, at 80 to 120 degrees C., for 0.5 to 1 hour while agitating.

The enzymatic transesterification, for example, can be carried out according to the steps of adding 0.02 to 10% by mass, preferably 0.04 to 5% by mass of a powdered lipase or an immobilized lipase to the oil-and-fat material, and reacting at 40 to 80 degrees C., preferably 40 to 70 degree C., for 0.5 to 48 hours, preferably 0.5 to 24 hours while agitating.

A fractionating method is not particularly limited. For example, it can be carried out by a dry fractionation, an emulsification fractionation, a solvent fractionation or the like can be used, and above all, the dry fractionation can realize an economical fractionation. The dry fractionation can be generally carried out by cooling the fractionation oil-and-fat material while agitating in a bath so as to deposit a crystal, and compressing and/or filtering so as to obtain a hard portion (crystal fraction) and a soft portion (liquid fraction). Although a fractionation temperature may vary in accordance with the property of fractionated oil-and-fat being required, it can be carried out at from 33 to 45 degrees C. In case of obtaining a general hard butter, it is appropriate that the fractionation temperature is 35 to 43 degrees C.

(XOX Type Oil-And-Fat)

In the embodiment of the invention, the XOX type oil-and-fat means an oil-and-fat containing not less than 45% by mass, preferably 50% by mass, more preferably 55% by mass, furthermore preferably 60% by mass of XOX (1, 3-saturated-2-olein triglyceride). Particularly, it includes a shea butter, a mango butter, a sal butter, an illipe butter, a kokum butter and a palm oil which are used as a substitute for cacao butter, and fractions obtained by fractionating the above-mentioned oil-and-fats so as to condense the XOX can be also used. In addition, a symmetrical triglyceride oil-and-fat obtained by introducing a saturated fatty acid to a high oleic oil-and-fat having a high oleic acid content such as high oleic sunflower, high oleic safflower at the 1,3-positions of triglyceride by using a 1,3-positions specific lipase can be also used. Particularly, a palm-based oil-and-fat such as a palm oil, a fractionated palm oil is preferable, and it is economically preferable to use a palm medium-melting fraction obtained by fractionating a palm oil so as to condense the XOX. In the embodiment, one or more than two selected from the oil-and-fats described above can be used either alone or in combination.

(Blend of Mixed Oil)

In order to obtain the oil-and-fat composition according to the embodiment of the invention, a mixed oil containing 50 to 95% by mass of the above-mentioned olein part of transesterified oil and 5 to 50% by mass of the above-mentioned XOX type oil-and-fat is used. It is preferable to use a mixed oil containing 60 to 95% by mass of the above-mentioned olein part of transesterified oil and 5 to 40% by mass of the above-mentioned XOX type oil-and-fat. It is more preferable to use a mixed oil containing 70 to 90% by mass of the above-mentioned olein part of transesterified oil and 10 to 30% by mass of the above-mentioned XOX type oil-and-fat. Also, it is preferable that the mixing is carried out in a state that the oil-and-fat is perfectly dissolved.

(Process of Fractionating Mixed Oil to Obtain Stearin Part)

The oil-and-fat composition according to the embodiment can be produced by fractionating the mixed oil blended as described above, so as to obtain a stearin part. The fractionating method is not particularly limited, and the above-mentioned method can be adopted.

[Production Method 2]

The oil-and-fat composition according to the embodiment of the invention can be produced by mixing 60 to 95% by mass of the following stearin part of transesterified oil and 5 to 40% by mass of the following XOX type oil-and-fat.

In the above, the stearin part of transesterified oil and the XOX type oil-and-fat respectively represent the following.

Stearin part of transesterified oil: a stearin part obtained by transesterifying a raw oil-and-fat containing 10 to 40% by mass of oleic acid, 10 to 40% by mass of stearic acid and 30 to 70% by mass of palmitic acid, and then fractionating it so as to obtain an olein part, and further fractionating the olein part XOX type oil-and-fat: an oil-and-fat containing not less than 45% by mass of XOX (Stearin Part of Transesterified Oil)

The stearin part of transesterified oil can be obtained by transesterifying a raw oil-and-fat containing 10 to 40% by mass of oleic acid, 10 to 40% by mass of stearic acid and 30 to 70% by mass of palmitic acid, and then fractionating it so as to obtain an olein part, and further fractionating the olein part. It is preferable to use a raw oil-and-fat containing 10 to 35% by mass of oleic acid, 15 to 40% by mass of stearic acid and 35 to 65% by mass of palmitic acid, and it is more preferable to use a raw oil-and-fat containing 10 to 30% by mass of oleic acid, 15 to 35% by mass of stearic acid and 35 to 55% by mass of palmitic acid.

As a particular example of the raw oil-and-fat, a method of transesterification, and a method of fractionation, the same example and methods used in the case of Production method 1 can be used.

(XOX Type Oil-And-Fat)

As the XOX type oil-and-fat, the same oil-and-fat used in the case of Production method 1 can be used.

(Blend of Mixed Oil)

In order to obtain the oil-and-fat composition according to the embodiment of the invention, a mixed oil containing 60 to 95% by mass of the above-mentioned stearin part of transesterified oil and 5 to 40% by mass of the above-mentioned XOX type oil-and-fat is obtained so that the oil-and-fat composition according to the embodiment can be produced. It is preferable to obtain a mixed oil so as to contain 70 to 90% by mass of the above-mentioned stearin part of transesterified oil and 10 to 30% by mass of the above-mentioned XOX type oil-and-fat. Also, it is preferable that the mixing is carried out in a state that the oil-and-fat is perfectly dissolved.

[Application of Oil-And-Fat Composition According to Embodiment of the Invention]

The oil-and-fat composition according to the embodiment of the invention can be used as an oil-and-fat substituted for the cacao butter, namely a non-tempering hard butter, and can be applied to an oily food.

In the embodiment of the invention, the oily food means processed foods that contain oil-and-fat compositions and sugars. The other food materials generally used in confectionery and bakery industries other than the oil-and-fat compositions and sugars can be also contained. The oily food includes, for example, a chocolate, a sand cream. The oily food is used as a coating or a filling of food such as cakes, bread products in a form of a chocolate or a sand cream.

The oil-and-fat composition according to the embodiment of the invention can be used so as to be contained in the oil-and-fat of the oily food in a range of 5 to 100% by mass, preferably 30 to 100% by mass and more preferably 50 to 100% by mass.

Advantages of Embodiment of the Invention

According to the embodiment of the invention, an oil-and-fat composition that is a non-tempering hard butter having a low trans-fatty acid content even though a non-lauric acid type, is excellent in processing suitability in case of using it as a coating chocolate, and is capable of providing a coated product with a good appearance, and a method of producing the oil-and-fat composition can be provided, and in addition to this, the following advantages can be provided.

(1) The oil-and-fat composition according to the invention is used, so that an oily food that has a good meltability in the mouth can be produced.

(2) The fractionating process for obtaining the oil-and-fat composition according to the invention can be carried out only by a dry fractionation, so that the oil-and-fat composition can be safely and easily produced without using solvent and special equipments that are needed in the solvent fractionation.

EXAMPLES

Hereinafter, the invention will be explained by Examples, but the invention can not be limited by Examples.

(Method of Analysis)

The fatty acid composition and the trans-fatty acid content were analyzed according to AOCS Celf-96.

The X2O type triglyceride (XOX+XXO+OXX) content and the PStO type triglyceride (PStO+POSt+StPO+StOP+OPSt+OStP) content were analyzed according to JAOCS. Vol. 70, 11, 1111-1114 (1993).

The XOX type triglyceride content was obtained by measuring a mass ratio XOX/(XXO+OXX) by a method according to J. High Resol. Chromatogr., 18, 105-107 (1995) based on the X2O type triglyceride content.

Here, X is a saturated fatty acid having carbon atom of not less than 16, O is oleic acid, St is stearic acid and P is palmitic acid.

[Production Method of Transesterified Oil A] (Used in Example)

First, 50% by mass of a fractionated palm oil (IV56) and 50% by mass of an extremely hardened oil of a soybean oil were mixed. The fatty acid content of the mixed oil was 21.3% by mass of oleic acid, 24.7% by mass of stearic acid and 46.5% by mass of palmitic acid. A transesterified oil A was obtained by transesterifying the mixed oil.

The transesterification was carried out in accordance with the common procedures of drying the raw oil-and-fats sufficiently, adding 0.2 mass % of sodium methoxide to the raw oil-and-fats, and reacting under reduced pressure, at 120 degrees C., for 0.5 hour while agitating.

[Production Method of XOX Type Oil-And-Fat B]

A palm medium-melting fraction (PMF45) having an iodine value of 45 and a palm medium-melting fraction (PMF37) having an iodine value of 37 were used as a XOX type oil-and-fat B. The XOX content of the PMF45 was 50.3% by mass. The XOX content of the PMF37 was 61.8% by mass.

In addition, a high POP content oil-and-fat that was obtained by further fractionating the above-mentioned PMF37 and manufactured by Malaysia Intercontinental Specialty Fats Sdn. Bhd. was also used. The XOX content of the high POP content oil-and-fat was 74.6% by mass.

[Production Method of Transesterified Oil C] (Used in Comparative Example)

First, 60% by mass of a palm stearin and 40% by mass of a palm oil were mixed. The fatty acid content of the mixed oil was 30.4% by mass of oleic acid, 4.7% by mass of stearic acid and 55.3% by mass of palmitic acid. A transesterified oil C was obtained by transesterifying the mixed oil. The transesterification was carried out by the same method that was used in the case of the transesterified oil A described above.

[Production Method of Transesterified Oil D] (Used in Example)

First, 22% by mass of a high oleic sunflower oil, 30% by mass of a palm stearin and 48% by mass of an extremely hardened oil of a soybean oil were mixed. The fatty acid content of the mixed oil was 25.6% by mass of oleic acid, 43.9% by mass of stearic acid and 24.8% by mass of palmitic acid. A transesterified oil D was obtained by transesterifying the mixed oil. The transesterification was carried out by the same method that was used in the case of the transesterified oil A described above.

Production Method of Oil-And-Fat Compositions of Examples 1 to 3

The transesterified oil A was dry-fractionated at 38 to 41 degrees C., so as to obtain a stearin part and an olein part.

Next, 70% by mass of the olein part of the transesterified oil A obtained was mixed with 30% by mass of the PMF37 as the above-mentioned XOX type oil-and-fat B, and a dry-fractionation was further carried out at 38 to 41 degrees C. so as to obtain a stearin part that was adopted as an oil-and-fat composition of Example 1.

Stearin parts obtained by using the same method that was used in Example 1 and using the compositions of Examples 2 to 3 shown in Table 1 were adopted as oil-and-fat compositions of Examples 2 to 3.

Production Method of Oil-And-Fat Composition of Comparative Example 1

The transesterified oil A was dry-fractionated at 38 to 41 degrees C., so as to obtain a stearin part and an olein part.

Next, 100% by mass of the olein part of the transesterified oil A obtained was further fractionated, so as to obtain a stearin part that was adopted as an oil-and-fat composition of Comparative Example 1.

Production Method of Oil-And-Fat Compositions of Examples 4 to 6

The transesterified oil A was dry-fractionated at 38 to 41 degrees C., so as to obtain a stearin part and an olein part.

Next, 90% by mass of a stearin part obtained by further dry-fractionating the olein part of the transesterified oil A obtained was mixed with 10% by mass of the PMF37 as the XOX type oil-and-fat B, so as to obtain a mixed oil that was adopted as an oil-and-fat composition of Example 4.

The mixed oils obtained by using the same method that was used in Example 4 and using the compositions of Examples 5 to 6 shown in Table 2 were adopted as oil-and-fat compositions of Examples 5 to 6.

Production Method of Oil-And-Fat Compositions of Examples 7 to 8

The transesterified oil A was dry-fractionated at 38 to 41 degrees C., so as to obtain a stearin part and an olein part.

Next, 90% by mass of a stearin part obtained by further dry-fractionating at 38 to 41 degrees C. the olein part of the transesterified oil A obtained was mixed with 10% by mass of the high POP content oil-and-fat as the XOX type oil-and-fat B, so as to obtain a mixed oil that was adopted as an oil-and-fat composition of Example 7.

The mixed oil obtained by using the same method that was used in Example 7 and using the composition of Example 8 shown in Table 2 was adopted as oil-and-fat composition of Example 8.

Production Method of Oil-And-Fat Compositions of Comparative Examples 2 to 3

The transesterified oil C was dry-fractionated at 38 to 41 degrees C., so as to obtain a stearin part and an olein part.

Next, 50% by mass of the olein part of the transesterified oil C obtained was mixed with 20% by mass of the above-mentioned PMF37 and 30% by mass of sal butter, and a dry-fractionation was further carried out at 38 to 41 degrees C. so as to obtain a stearin part and an oleic part that were adopted as oil-and-fat compositions of Comparative Example 2 (stearin part) and Comparative Example 3 (oleic part).

Oil-And-Fats of Comparative Examples 4 to 5

An oil-and-fat containing 100% by mass of the above-mentioned PMF37 was adopted as an oil-and-fat of Comparative Example 4 and an oil-and-fat containing 100% by mass of the above-mentioned high POP content oil-and-fat was adopted as an oil-and-fat of Comparative Example 5.

Production Method of Oil-And-Fat Compositions of Example 9

The transesterified oil D was dry-fractionated at 38 to 41 degrees C., so as to obtain a stearin part and an olein part.

Next, 60% by mass of the olein part of the transesterified oil D obtained was mixed with 40% by mass of the above-mentioned palm medium-melting fraction 45 (PMF45) as the XOX type oil-and-fat B, and acetone of which volume was four times that of the above-mentioned mixture of the olein part of the transesterified oil D and the palm medium-melting fraction 45 (PMF45) was mixed, and a solvent fractionation was further carried out at −2 to 1 degrees C. so as to obtain a stearin part that were adopted as oil-and-fat compositions of Example 9.

[Analysis of Fatty Acid Composition and the Like]

Results of analysis of the fatty acid composition and the like about Examples 1 to 9 and Comparative Examples 1 to 5 in accordance with the above-mentioned analysis method are shown in Tables 1 to 4. Every oil-and-fat has a lauric acid content of 0.1% by mass except that the oil-and-fat of Comparative Example 3 has a lauric acid content of 0.2% by mass.

TABLE 1

Composition and Analysis value in Examples 1 to 3 and Comparative Example 1

|  | Example 1 | Example 2 | Example 3 | Com. Ex. 1 |
|---|---|---|---|---|
| [Composition] (% by mass) |  |  |  |  |
| Olein part of transesterified oil A | 70 | 85 | 90 | 100 |
| PMF37 | 30 | 15 | 10 | — |
| [Analysis value] |  |  |  |  |
| X2O (% by mass) | 70.1 | 66.8 | 69.3 | 63.5 |
| XOX (% by mass) | 39.4 | 29.3 | 25.3 | 20.4 |
| PStO (% by mass) | 26.6 | 30.1 | 34.2 | 32.1 |
| XOX/X2O | 0.56 | 0.44 | 0.37 | 0.32 |
| PStO/X2O | 0.38 | 0.45 | 0.49 | 0.51 |
| St (% by mass) | 29.7 | 36.7 | 40.4 | 42.1 |
| P (% by mass) | 36.3 | 29.9 | 27.7 | 25.5 |
| St/P | 0.82 | 1.23 | 1.46 | 1.65 |
| Trans-fatty acid content (% by mass) | 0.1 | 0.1 | 0.0 | 0.1 |

Notes)
Com. Ex. 1: Comparative Example 1

TABLE 2

Composition and Analysis value in Examples 4 to 8

|  | Example 4 | Example 5 | Example 6 | Example 7 | Example 8 |
|---|---|---|---|---|---|
| [Composition] (% by mass) |  |  |  |  |  |
| stearin part obtained by dry-fractionating olein part of transesterified oil A | 90 | 80 | 70 | 90 | 70 |
| PMF37 | 10 | 20 | 30 | — | — |
| POP high content oil-and-fat | — | — | — | 10 | 30 |
| [Analysis value] |  |  |  |  |  |
| X2O (% by mass) | 64.4 | 65.2 | 66.0 | 65.6 | 69.9 |
| XOX (% by mass) | 24.8 | 29.3 | 33.4 | 25.7 | 38.3 |
| PStO (% by Mass) | 30.0 | 27.9 | 25.9 | 30.3 | 26.7 |
| XOX/X2O | 0.39 | 0.45 | 0.51 | 0.39 | 0.55 |
| PStO/X2O | 0.47 | 0.43 | 0.39 | 0.46 | 0.38 |
| St (% by mass) | 38.4 | 34.7 | 31.0 | 38.5 | 31.1 |
| P (% by mass) | 28.5 | 31.5 | 34.5 | 28.8 | 35.4 |
| St/P | 1.35 | 1.10 | 0.90 | 1.34 | 0.88 |
| Trans-fatty acid content (% by mass) | 0.1 | 0.1 | 0.1 | 0.1 | 0.1 |

TABLE 3

Composition and Analysis value in Comparative Examples 2 to 5

|  | Com. Ex. 2 | Com. Ex. 3 | Com. Ex. 4 | Com. Ex. 5 |
|---|---|---|---|---|
| [Composition] (% by mass) | Stearin part | Olein part |  |  |
| Olein part of transesterified oil C | 50 | 50 | — | — |
| PMF37 | 20 | 20 | 100 | — |
| POP high content oil-and-fat | — | — | — | 100 |
| Sal butter | 30 | 30 | — | — |
| [Analysis value] |  |  |  |  |
| X2O (% by mass) | 70.5 | 26.4 | 71.9 | 84.7 |
| XOX (% by mass) | 55.7 | 14.6 | 61.8 | 74.6 |
| PStO (% by mass) | 12.3 | 3.4 | 11.5 | 13.6 |
| XOX/X2O | 0.79 | 0.55 | 0.86 | 0.88 |
| PStO/X2O | 0.17 | 0.13 | 0.16 | 0.16 |
| St (% by mass) | 22.5 | 7.1 | 5.0 | 5.4 |
| P (% by mass) | 36.0 | 33.7 | 55.6 | 58.5 |
| St/P | 0.63 | 0.21 | 0.09 | 0.09 |
| Trans-fatty acid content (% by mass) | 0.0 | 0.0 | 0.1 | 0.0 |

Notes)
Com. Ex. 2: Comparative Example 2
Com. Ex. 3: Comparative Example 3
Com. Ex. 4: Comparative Example 4
Com. Ex. 5: Comparative Example 5

TABLE 4

Composition and Analysis value in Example 9

|  | Example 9 |
|---|---|
| [Composition] (% by mass) |  |
| Olein part of transesterified oil D | 60 |
| PMF45 | 40 |
| [Analysis value] |  |
| X2O (% by mass) | 71.5 |
| XOX (% by mass) | 43.0 |
| PStO (% by mass) | 24.2 |
| XOX/X2O | 0.60 |
| PStO/X2O | 0.34 |
| St (% by mass) | 27.6 |
| P (% by mass) | 36.3 |
| St/P | 0.76 |
| Trans-fatty acid content (% by mass) | 0.1 |

As seen from Tables 1 to 4, the oil-and-fat compositions obtained in Examples 1 to 9 have a low trans-fatty acid content.

[Measurement of Iodine Value and SFC]

Results of measurement of the iodine value, melting point and SEC about Examples 1 to 9 and Comparative Examples 1 to 5 are shown in Tables 5 to 8.

The measurement of SFC was carried out according to IUPAC method 2.150a "Solid Content determination in Fats by NMR".

TABLE 5

Measurement result of Examples 1 to 3 and Comparative Example 1

|  | Example 1 | Example 2 | Example 3 | Com. Ex. 1 |
|---|---|---|---|---|
| Iodine value | 32.4 | 31.9 | 30.4 | 31.5 |
| Melting point (degrees C.) | 38.5 | 39.5 | 42.1 | 42.3 |
| SFC (%) |  |  |  |  |
| 10 (degrees C.) | 87.5 | 84.9 | 86.1 | 85.3 |
| 15 (degrees C.) | 86.1 | 83.9 | 83.1 | 84.6 |
| 20 (degrees C.) | 71.8 | 77.3 | 82.3 | 83.7 |
| 25 (degrees C.) | 44.2 | 52.3 | 62.2 | 63.7 |
| 30 (degrees C.) | 23.9 | 30.0 | 37.8 | 38.2 |
| 35 (degrees C.) | 10.9 | 15.5 | 21.7 | 21.7 |
| 40 (degrees C.) | 0.6 | 3.2 | 7.4 | 7.6 |
| 45 (degrees C.) | 0.0 | 0.0 | 0.0 | 0.0 |

Notes)
Com. Ex. 1: Comparative Example 1

TABLE 6

Measurement result of Examples 4 to 8

|  | Example 4 | Example 5 | Example 6 | Example 7 | Example 8 |
|---|---|---|---|---|---|
| Iodine value | 32.1 | 32.6 | 33.2 | 31.6 | 31.8 |
| Melting point (degrees C.) | 41.1 | 39.2 | 38.4 | 40.9 | 38.3 |
| SFC (%) | | | | | |
| 10 (degrees C.) | 83.9 | 84.0 | 84.1 | 85.1 | 87.9 |
| 15 (degrees C.) | 83.7 | 83.7 | 83.7 | 83.1 | 86.7 |
| 20 (degrees C.) | 78.9 | 75.1 | 71.7 | 79.9 | 75.4 |
| 25 (degrees C.) | 56.9 | 51.8 | 47.5 | 57.0 | 48.1 |
| 30 (degrees C.) | 33.2 | 30.5 | 27.1 | 33.3 | 26.8 |
| 35 (degrees C.) | 18.9 | 16.1 | 13.5 | 19.0 | 13.2 |
| 40 (degrees C.) | 5.6 | 4.0 | 2.4 | 5.4 | 2.6 |
| 45 (degrees C.) | 0.0 | 0.0 | 0.0 | 0.0 | 0.0 |

TABLE 7

Measurement result of Comparative Examples 2 to 5

|  | Com. Ex. 2 | Com. Ex. 3 | Com. Ex. 4 | Com. Ex. 5 |
|---|---|---|---|---|
| Iodine value | 35.5 | 58.7 | 37.2 | 32.4 |
| Melting point (degrees C.) | 30.6 | 28.0 | 31.8 | 32.2 |
| SFC (%) | | | | |
| 10 (degrees C.) | 85.4 | 10.1 | 88.7 | 96.3 |
| 15 (degrees C.) | 76.5 | 3.0 | 82.4 | 92.5 |
| 20 (degrees C.) | 45.9 | 2.2 | 69.7 | 88.4 |
| 25 (degrees C.) | 16.2 | 1.4 | 28.7 | 49.1 |
| 30 (degrees C.) | 5.6 | 1.0 | 6.7 | 6.3 |
| 35 (degrees C.) | 0.1 | 0.2 | 0.9 | 0.1 |
| 40 (degrees C.) |  | 0.0 |  |  |
| 45 (degrees C.) |  |  |  |  |

Notes)
Com. Ex. 2: Comparative Example 2
Com. Ex. 3: Comparative Example 3
Com. Ex. 4: Comparative Example 4
Com. Ex. 5: Comparative Example 5

TABLE 8

Measurement result of Example 9

|  | Example 9 |
|---|---|
| Iodine value | 33.3 |
| Melting point (degrees C.) | 36.8 |
| SFC (%) | |
| 10 (degrees C.) | 84.2 |
| 15 (degrees C.) | 82.2 |
| 20 (degrees C.) | 64.0 |
| 25 (degrees C.) | 37.6 |
| 30 (degrees C.) | 20.5 |
| 35 (degrees C.) | 7.6 |
| 40 (degrees C.) | 0.0 |
| 45 (degrees C.) | 0.0 |

As seen from the results of measurement (SFC value) shown in Tables 5 to 8, the oil-and-fat compositions obtained in Examples 1 to 9 have a good melting property (meltability in the mouth).

[Evaluation Test of Chocolate]

With regard to the oil-and-fat compositions (hard butters) of Examples 1, 3, 6, 8 and Comparative Example 1, a non-tempering chocolate was experimentally produced in accordance with the composition shown in Table 9, and drying property, appearance, adhesive property and meltability in the mouth thereof were scored by five expert panelists in three grades of good (3 points), usual (2 points) and bad (1 point), and an evaluation was carried out in accordance with the criteria described below. Results of evaluation are shown in Table 10.

⊚: Average point of five panelists was not less than 2.0 points.
○: Average point of five panelists was not less than 1.5 points and less than 2.0 points.
x: Average point of five panelists was not less than 1.0 points and less than 1.5 points.

(1) Evaluation of Drying Property

The evaluation of drying property was carried out by evaluating a drying speed at normal temperature. A concrete method is shown below.

A chocolate was melted at a temperature of 55 degrees C., next, it was preliminarily cooled to 40 degrees C.

Next, one surface of a yeast doughnut whose temperature was preliminarily controlled at 25 degrees C. was immersed in the covering chocolate whose temperature was preliminarily controlled at 40 degrees C. Next, the yeast doughnut was lifted up, and the excess covering chocolate was dropped, and then it was statically left at a temperature of 23 degrees C. After that, the time until the chocolate comes not to adhere to fingers in all sites thereof when the whole surface of the coating is touched with the fingers was measured. The drying property was evaluated in accordance with the criteria described below.

Good: The time until the chocolate comes not to adhere to fingers in all sites thereof was not more than 10 minutes.
Usual: The time until the chocolate comes not to adhere to fingers in all sites thereof was more than 10 minutes and not more than 15 minutes.
Bad: The time until the chocolate comes not to adhere to fingers in all sites thereof was more than 15 minutes.

(2) Evaluation of Appearance

A surface state of the chocolate coated to the yeast doughnut described in the item (1) was observed and the appearance was evaluated in accordance with the criteria described below.

Good: The surface has a good gloss and it is not be marked even if touched.
Usual: The surface has a gloss and it is not be marked even if touched.
Bad: The surface does not have a gloss and it appears to be dried.

(3) Evaluation of Adhesive Property

The yeast doughnut described in the item (1) and the chocolate coated to the yeast doughnut were eaten and the adhesive property was evaluated in accordance with the criteria described below.

Good: The chocolate is soft and adheres to the surface of the yeast doughnut without peeling.
Usual: The chocolate is soft but a portion that partially peels when touched is observed.
Bad: The chocolate is hard and it peels when strongly touched.

(4) Evaluation of Meltability in the Mouth

Only a part of the chocolate coated to the yeast doughnut described in the item (1) was eaten and the meltability was evaluated in accordance with the criteria described below.

Good: The meltability in the mouth is good and an unpleasant taste of "remaining behind" is not felt.
Usual: The meltability in the mouth is good and an unpleasant taste of "remaining behind" is hardly felt.
Bad: The meltability in the mouth is bad and an unpleasant taste of "remaining behind" is considerably felt.

TABLE 9

| Composition of chocolate (% by mass) | |
| --- | --- |
| Cacao mass | 8.0 |
| Cocoa powder | 4.0 |
| Powder sugar | 57.6 |
| Test oil-and-fat | 30.0 |
| Lecithin | 0.4 |

TABLE 10

Evaluation test result of chocolate

| | Example 1 | Example 3 | Example 6 | Example 8 | Com. Ex. 1 |
| --- | --- | --- | --- | --- | --- |
| Drying property | ◎ | ○ | ◎ | ◎ | ○ |
| Appearance | ◎ | ○ | ◎ | ◎ | X |
| Adhesive property | ◎ | ◎ | ◎ | ◎ | ◎ |
| Meltability in the mouth | ◎ | ○ | ◎ | ◎ | ○ |

Notes)
Com. Ex. 1: Comparative Example 1

As seen from Table 10, the oil-and-fat compositions (hard butters) obtained in Examples 1, 3, 6 and 8 are excellent in drying property, appearance, adhesive property and meltability in the mouth, so that they are excellent in processing suitability when they are used as a coating chocolate.

What is claimed is:

1. An oil-and-fat composition, meeting five requirements (a) to (e) described below:
    (a) an X2O content is 50% to 80% by mass;
    (b) an XOX content is not more than 50% by mass;
    (c) a mass ratio XOX/X2O is 0.3 to 0.8;
    (d) a mass ratio PStO/X2O is 0.2 to 0.6; and
    (e) a mass ratio St/P is 0.4 to 1.5,
    wherein in the five requirements (a) to (e), X, O, P, St, X2O, XOX, and PStO respectively represent following:
        X: saturated fatty acid comprising carbon atom of not less than 16;
        O: oleic acid;
        P: palmitic acid;
        St: stearic acid;
        X2O: triglyceride in which two molecules of X and one molecule of O are bonded;
        XOX: triglyceride in which X is bonded to 1, 3-position and O is bonded to 2-position; and
        PStO: triglyceride in which P, St, and O are bonded.

2. The oil-and-fat composition according to claim 1, wherein in the requirement (d), the mass ratio PStO/X2O is 0.3 to 0.6, and wherein in the requirement (e), the mass ratio St/P is 0.5 to 1.5.

3. A method of producing an oil-and-fat composition, the method comprising:
    fractionating a mixed oil comprising 50% to 95% by mass of an olein part of transesterified oil and 5% to 50% by mass of an XOX type oil-and-fat, so as to obtain a stearin part from the fractionating of the mixed oil,
    wherein the olein part is obtained by transesterifying a raw oil-and-fat comprising 10% to 40% by mass of oleic acid, 10% to 50% by mass of stearic acid, and 15% to 70% by mass of palmitic acid, and then fractionating it, and
    wherein the XOX type oil-and-fat comprises not less than 45% by mass of XOX.

4. A method of producing an oil-and-fat composition, the method comprising:
    fractionating a mixed oil comprising 60% to 95% by mass of an olein part of transesterified oil and 5% to 40% by mass of an XOX type oil-and-fat, so as to obtain a stearin part from the fractionating of the mixed oil,
    wherein the olein part is obtained by transesterifying a raw oil-and-fat comprising 10% to 40% by mass of oleic acid, 10% to 40% by mass of stearic acid, and 30% to 70% by mass of palmitic acid, and then fractionating it, and
    wherein the XOX type oil-and-fat comprises not less than 50% by mass of XOX.

5. A method of producing an oil-and-fat composition, the method comprising:
    mixing 60% to 95% by mass of a second stearin part of transesterified oil and 5% to 40% by mass of an XOX type oil-and-fat,
    wherein the second stearin part is obtained by:
        transesterifying a raw oil-and-fat comprising 10% to 40% by mass of oleic acid, 10% to 40% by mass of stearic acid, and 30% to 70% by mass of palmitic acid;
        fractionating the raw oil-and-fat that is transesterified to obtain a first olein part and a first stearin part; and
        fractionating the first olein part to obtain the second stearin part, and
    wherein the XOX type oil-and-fat comprises not less than 45% by mass of XOX.

6. The method of producing an oil-and-fat composition according to claim 5, wherein the XOX type oil-and-fat comprises an oil-and-fat comprising not less than 50% by mass of XOX.

7. An oily food produced by using the oil-and-fat composition according to claim 1.

8. A food produced by using the oily food according to claim 7.

* * * * *